United States Patent Office 3,466,237
Patented Sept. 9, 1969

3,466,237
METHOD OF OBTAINING AN INTERMETALLIC COMPOUND OF NIOBIUM AND TIN IN FABRICATED FORM
Anthony Clifford Barber, Lichfield, England, assignor to Imperial Metal Industries (Kynoch) Limited, Birmingham, England, a corporation of Great Britain
No Drawing. Continuation-in-part of application Ser. No. 330,656, Dec. 16, 1963. This application Sept. 6, 1966, Ser. No. 577,150
Claims priority, application Great Britain, Sept. 17, 1965, 39,724/65
Int. Cl. B01k 5/00; C23b 13/00
U.S. Cl. 204—181                                     8 Claims

ABSTRACT OF THE DISCLOSURE

A method of manufacturing an article having superconducting properties resulting from the presence of $Nb_3Sn$ comprises depositing tin powder on niobium by electrophoresis and heating to cause the tin to react with the niobium to form $Nb_3Sn$.

---

This invention relates to the production of fabricated articles comprising a brittle intermetallic compound of niobium and tin having superconducting properties at low temperatures. This application describes an improvement over the invention described in application Ser. No. 330,656, Dec. 16, 1963, now abandoned.

The invention is especially concerned with articles having a continuous layer of the intermetallic compound of niobium and tin. This compound is referred to herein by the formula $Nb_3Sn$ which is generally accepted as the formula of the superconducting intermetallic compound of niobium and tin, but it does not preclude the possibility of variations from stoichiometric proportions, or that a compound of slightly different formula may be responsible for the superconducting properties.

In order to utilise the properties of the compound to best advantage it is often required in the form of thin sheet, foil or wire wound into shapes suitable for electrical apparatus. The compound is, however, extremely hard and brittle and is, therefore, impossible to fabricate by normal methods.

The aforesaid appplication describes a method of producing a fabricated article having a continuous layer of $Nb_3Sn$ over at least part of the surface, in which tin and niobium are deposited upon a niobium support and subjected to a first heat-treatment, a cold-working operation and a second heat-treatment.

We have found that, particularly where a very thin niobium support is concerned, such as tape or wire, the above method may be considerably simplified.

According to the present invention a method of manufacturing an article having a continuous layer of $Nb_3Sn$ comprises the steps of depositing a layer of tin powder on to a layer of niobium by electrophoresis, and heating the layers of tin and niobium at a temperature between 950° C. and 1600° C. in a nonoxidising atmosphere so as to cause at least some of the tin to react with at least some of the niobium to form a continuous layer of $Nb_3Sn$.

Within the terms "niobium" and "tin" we wish to include alloys of niobium and tin which will react together when heated to form the desired reaction products. Preferably the niobium layer is in the form of tape or wire.

We have found surprisingly, that the layer of tin obtained by electrophoresis does not evaporate to an excessive degree during heat-treatment and is sufficiently adherent in the green state to be easily handled. However, in order to produce a very stong deposit of tin, it is desirable to modify the conditions of electrophoresis from those of our copending application mentioned above. The principal modifications are a reduction in the zein content, to less than 1.6 grams per 100 mils, and in the aluminium nitrate content, to less than 0.03 gram per 100 mils, of the suspension from which the tin is deposited.

The heat-treatment which produces the reaction between tin and niobium is preferably between 950° C. and 1200° C. and the time of treatment will vary according to the temperature used. At the higher temperature, times of the order of 5 minutes or less may be adequate, but times of the order of hours may be required at lower temperatures. Examples of suitable nonoxidising atmospheres are inert gases or a vacuum.

A typical example of the invention will now be described:

A length of Nb tape, 0.003 inch thick and 0.110 inch wide was coated by electrophoresis with a layer of Sn powder 0.002 inch thick from a suspension of tin powder of particle size predominantly less than 20 microns in a stirred liquid mixture containing 50/50 volume percent nitromethane/isopropyl alcohol solution, 1.1 grams zein per litre, 0.036 gram aluminium nitrate per litre and 36 grams of tin powder per litre. A platinised titanium anode was used at a current density of more than 2 milliamps. per sq. cm.

The resulting composite was heated in vacuo for 20 minutes at 975° C. A continuous layer of $Nb_3Sn$ was obtained on the surface by reaction of the tin and niobium. Superconductivity tests at 4.2° K. showed that this sample carried 150 amps. at an applied magnetic field of 40K gauss.

I claim:
1. A method of manufacturing an article having a continuous layer of $Nb_3Sn$ comprising the steps of depositing a layer of tin powder on to a layer of niobium by electrophoresis, and heating the layers of tin and niobium at a temperature between 950° C. and 1600° C. in a nonoxidising atmosphere so as to cause at least some of the tin to react with at least some of the niobium to form a continuous layer of $Nb_3Sn$.

2. A method according to claim 1 wherein the layers of tin and niobium are heated at a temperature between 950° C. and 1200° C.

3. A method according to claim 1 wherein the layers of tin and niobium are heated for at least 5 minutes.

4. A method according to claim 1 wherein the layers of tin and niobium are heated in vacuo for about 20 minutes at approximately 975° C.

5. A method according to claim 1 wherein the tin powder is electrophoretically deposited from a solution containing less than 1.6 grams of zein per 100 mils and less than 0.03 gram of aluminium nitrate per 100 mils.

6. A method according to claim 5 wherein the tin powder is electrophoretically deposited from a solution containing approximately 1.1 grams of zein per litre.

7. A method according to claim 5 wherein the tin powder is electrophoretically deposited from a solution containing approximately 0.036 gram of aluminium nitrate per litre.

8. A method as in claim 1 wherein the niobium layer is in the form of a thin, elongated structure and wherein the tin powder is deposted on said structure in a layer about 0.002 inch thick.

References Cited

UNITED STATES PATENTS

| | | | |
|---|---|---|---|
| 2,878,140 | 3/1959 | Barr | 204—181 |
| 2,982,707 | 5/1961 | Scheible | 204—181 |
| 3,181,936 | 5/1965 | Denny et al. | 204—37.5 |
| 3,218,693 | 11/1965 | Allen et al. | 204—37.5 |
| 3,270,400 | 9/1966 | Saur | 204—37.5 |
| 3,277,577 | 10/1966 | Ham | 204—37.5 |
| 3,309,179 | 3/1967 | Fairbanks | 204—37.5 |

FOREIGN PATENTS 945,907  1/1964  Great Britain.

OTHER REFERENCES

Pearlstein et al.: "Electrophoretic Deposition of Metals," in Journal of the Electrochemical Society, vol. 110, No. 7, July 1963, pp. 843–845, 204–181.

JOHN H. MACK, Primary Examiner

E. ZAGARELLA, Jr., Assistant Examiner

U.S. Cl. X.R.

204—37